US 6,995,652 B2

(12) United States Patent
Carrender et al.

(10) Patent No.: US 6,995,652 B2
(45) Date of Patent: Feb. 7, 2006

(54) SYSTEM AND METHOD FOR CONTROLLING REMOTE DEVICES

(75) Inventors: Curtis Lee Carrender, Richland, WA (US); Ronald W. Gilbert, Benton City, WA (US); Jeff W. Scott, Pasco, WA (US); David A. Clark, Kennewick, WA (US)

(73) Assignee: Battelle Memorial Institute K1-53, Richland, WA (US)

( * ) Notice: Subject to any disclaimer, the term of this patent is extended or adjusted under 35 U.S.C. 154(b) by 510 days.

(21) Appl. No.: 09/833,465

(22) Filed: Apr. 11, 2001

(65) Prior Publication Data
US 2002/0149468 A1 Oct. 17, 2002

(51) Int. Cl.
*G05B 19/00* (2006.01)

(52) U.S. Cl. .................................. 340/5.61; 340/572.3

(58) Field of Classification Search .............. 42/70.05, 42/70.06, 70.11; 340/572.3, 572.5, 5.31, 340/5.72, 5.71, 5.73, 5.61; 257/679
See application file for complete search history.

(56) References Cited

U.S. PATENT DOCUMENTS

| | | | | |
|---|---|---|---|---|
| 4,914,735 A | * | 4/1990 | Ichiyoshi | 342/125 |
| 5,448,847 A | | 9/1995 | Teetzel | 42/70.11 |
| 5,528,221 A | | 6/1996 | Jeuch et al. | 340/572 |
| 5,874,902 A | * | 2/1999 | Heinrich et al. | 340/10.51 |
| 6,025,780 A | | 2/2000 | Bowers et al. | 340/572.3 |
| 6,147,605 A | | 11/2000 | Vega et al. | 340/572.7 |
| 6,181,248 B1 | | 1/2001 | Fockens | 340/572.3 |
| 6,317,028 B1 | * | 11/2001 | Valiulis | 340/10.1 |
| 6,412,207 B1 | * | 7/2002 | Crye et al. | 42/70.06 |

* cited by examiner

*Primary Examiner*—Michael Horabik
*Assistant Examiner*—M Shimizu
(74) *Attorney, Agent, or Firm*—Seed IP Law Group PLLC

(57) ABSTRACT

A system and method for controlling remote devices utilizing a radio frequency identification (RFID) tag device having a control circuit adapted to render the tag device, and associated objects, permanently inoperable in response to radio-frequency control signals. The control circuit is configured to receive the control signals that can include an enable signal, and in response thereto enable an associated object, such as a weapon; and in response to a disable signal, to disable the tag itself, or, if desired, to disable the associated weapon or both the device and the weapon. Permanent disabling of the tag can be accomplished by several methods, including, but not limited to, fusing a fusable link, breaking an electrically conductive path, permanently altering the modulation or backscattering characteristics of the antenna circuit, and permanently erasing an associated memory. In this manner, tags in the possession of unauthorized employees can be remotely disabled, and weapons lost on a battlefield can be easily tracked and enabled or disabled automatically or at will.

13 Claims, 3 Drawing Sheets

SYSTEM AND METHOD FOR CONTROLLING REMOTE DEVICES

STATEMENT REGARDING FEDERALLY-SPONSORED RESEARCH OR DEVELOPMENT

This invention was made with Government support under Contract DE-AC0676RLO1830 awarded by the U.S. Department of Energy. The Government has certain rights in the invention.

TECHNICAL FIELD

The present invention pertains to radio frequency identification (RFID) devices, and, more particularly, to an RFID system that renders RFID tags, and associated objects, inoperable.

BACKGROUND INFORMATION

Remote communication utilizing wireless equipment typically relies on radio frequency (RF) technology. One application of RF technology is in locating, identifying, and tracking objects, such as animals, inventory, and vehicles. RF identification (RFID) systems have been developed that facilitate monitoring of remote objects.

As shown in FIG. 1, a basic RFID system 10 includes two components: an interrogator or reader 12, and a transponder (commonly called an RF tag) 14. The interrogator 12 and RF tag 14 include respective antennas 16, 18. In operation, the interrogator 12 transmits through its antenna 16 a radio frequency interrogation signal 20 to the antenna 18 of the RF tag 14. In response to receiving the interrogation signal 20, the RF tag 14 produces a modulated response signal 22 that is transmitted back to the interrogator 12 through the tag antenna 18 by a process known as continuous wave backscatter.

The substantial advantage of RFID systems is the non-contact, non-line-of-sight capability of the technology. The interrogator 12 emits the interrogation signal 20 with a range from one inch to one hundred feet or more, depending upon its power output and the radio frequency used. Tags can be read through a variety of substances such as odor, fog, ice, paint, dirt, and other visually and environmentally challenging conditions where bar codes or other optically-read technologies would be useless. RF tags can also be read at high speeds, in most cases responding in less than one hundred milliseconds.

RF tags are divided into three main categories: Beam-powered passive tags, battery-powered semi-passive tags, and active tags. Each operates in different ways.

The beam-powered RFID tag is often referred to as a passive device because it derives the energy needed for its operation from the interrogation signal beamed at it. The tag rectifies the field and changes the reflective characteristics of the tag itself, creating a change in reflectivity that is seen at the interrogator. The battery-powered semi-passive RFID tag operates in a similar fashion, modulating its RF cross-section in order to reflect a delta to the interrogator to develop a communication link. Here, the battery is the source of the tag's operational power for optional circuitry. Finally, in the active RF tag, a transmitter is used to create its own radio frequency energy powered by the battery.

The range of communication for such tags varies according to the transmission power of the interrogator 12 and the RF tag 14. Battery-powered tags operating at 2,450 MHz have traditionally been limited to less than ten meters in range. However, devices with sufficient power can reach up to 200 meters in range, depending on the frequency and environmental characteristics.

Security systems have been designed that use RFID devices in providing restricted access to authorized personnel only, i.e., those personnel or employees authorized to carry a tag. However, a drawback to such systems is that tags may be lost or stolen and later used by unauthorized individuals, thus compromising the security. In addition, employees who are no longer authorized to have access or who have been terminated may continue to use the tag or they may tamper with the tag to obtain information stored therein.

BRIEF SUMMARY OF THE INVENTION

The disclosed embodiments of the invention are directed to a method and system for controlling objects, such as RFID tags, and associated operable objects.

In one embodiment of the invention, an RFID device is provided that includes a receiver circuit configured to receive an interrogation signal and to return a radio frequency signal in response thereto. The receiver circuit is further configured to receive a disable signal and to process the disable signal to render the device permanently inoperable.

In another embodiment, a radio frequency identification and control device for tracking and controlling an operable object is provided. The device is configured to respond to interrogation and control signals from a remote radio frequency identification interrogator. In this embodiment of the invention, a receiver circuit is provided integral with the object and configured to generate return radio frequency signals in response to the interrogation signals and it is adapted to be coupled to the object to render the object inoperable in response to a disable signal.

In accordance with another aspect of the foregoing embodiment, the receiver circuit utilizes the operable object as at least a portion of or the entire receiving antenna.

In accordance with another aspect of the foregoing embodiment, the receiver circuit is configured to enable operation of the object in response to an enable signal.

In accordance with another embodiment of the invention, a method for controlling an RFID device is provided. The method includes transmitting a disable signal to the device and receiving and processing the disable signal to render the device irreversibly non-responsive. The device can be coupled to an operable object, such as a weapon, and configured to render the object or weapon operable in response to an enable signal or permanently inoperable in response to a disable signal.

BRIEF DESCRIPTION OF THE DRAWINGS

The following detailed description of the embodiments of the invention will be more readily understood when taken in conjunction with the following drawings, wherein.

DETAILED DESCRIPTION OF THE INVENTION

Figure 1:
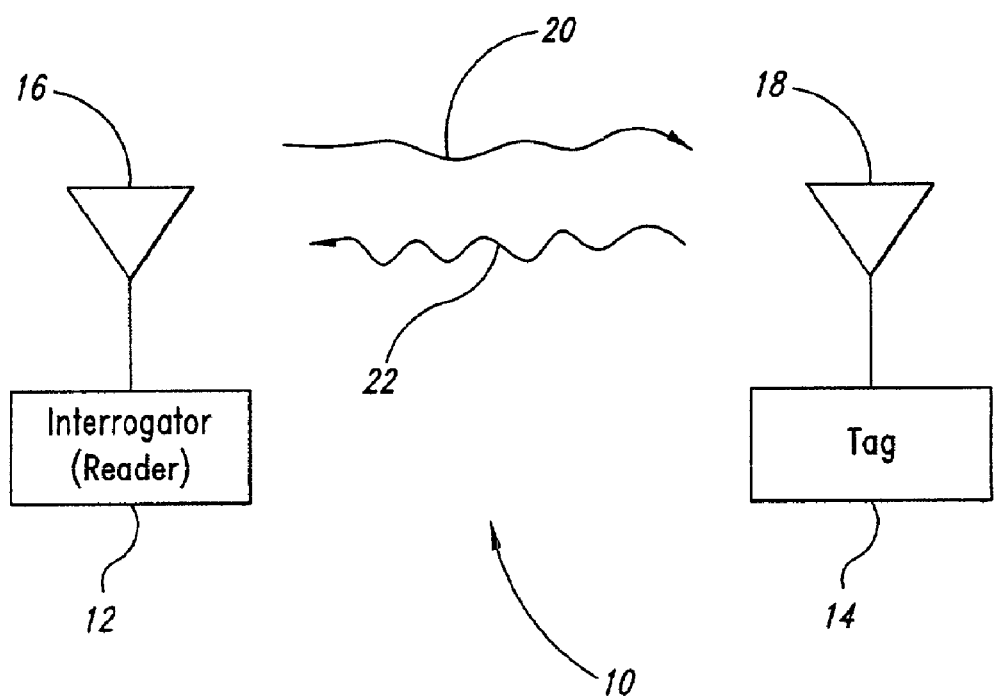
FIG. 1 is a diagram of an RFID system known in the art.
Figure 2A:
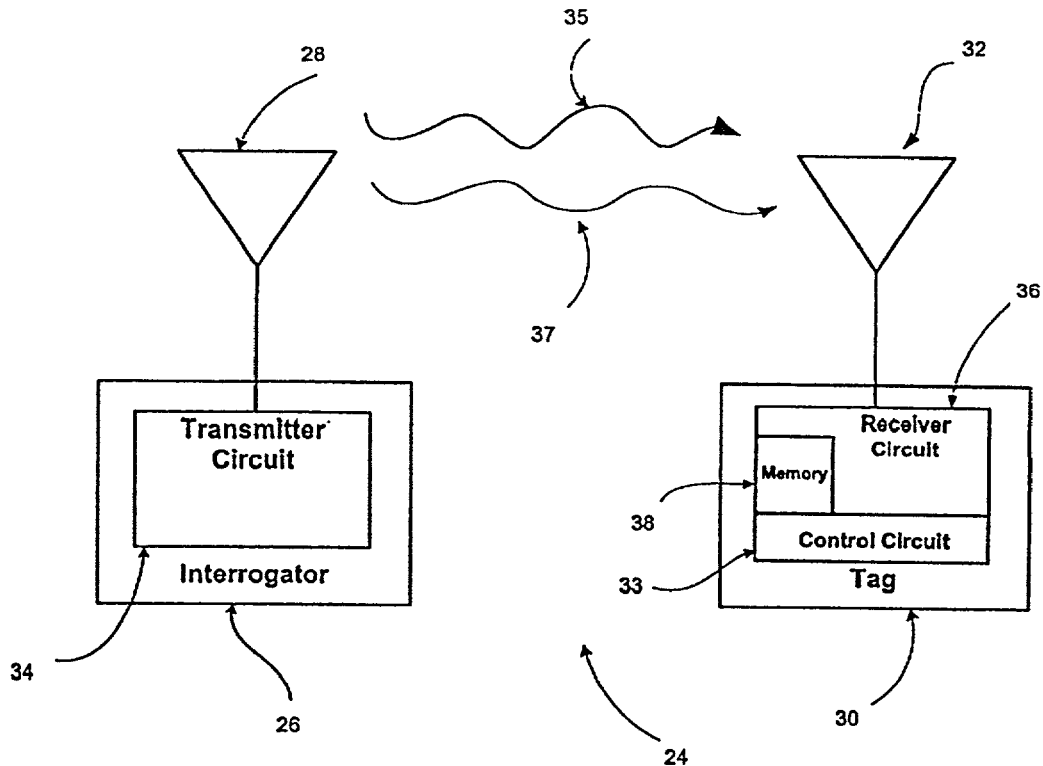
FIGS. 2A and 2B are RFID systems utilizing RFID devices in accordance with the present invention.

Referring initially to FIG. 2A, shown therein is an RFID system 24 comprising an interrogator 26 having an antenna circuit 28 configured to transmit and receive radio frequency signals to and from an RFID device 30 having an antenna 32. The interrogator 26 includes a transmitter circuit 34 coupled to the antenna 28. The transmitter 34 is configured to transmit interrogation signals 35 to the RFID device 30. In addition, the transmitter 34 is configured to generate control signals 37 that include a disable signal for reception by the RFID device 30.

A receiver circuit 36 is coupled to the antenna 32 in the RFID device 30. The antenna 32 may be configured to receive both the interrogation and control signals, or multiple antennas may be used. The receiver circuit 36 is configured in a conventional manner to enable the RFID device 30 to return a radio frequency signal (not shown) in response to the interrogation signals 35 from the interrogator 26. In this embodiment, the RFID device 30 is a passive RFID tag that utilizes modulated backscatter reflection of the interrogation signals 35 to respond to the interrogator 26.

The receiver circuit 36 has associated with it a control circuit 33 that is configured to respond to the control signals 37 from the interrogator 26, which include a disable signal. The disable signal is received and processed by the control circuit 33 to render the RFID device 30 permanently inoperable. In this embodiment, the control signal is a modulated signal transmitted at the same frequency as the interrogation signal.

Figure 2B:
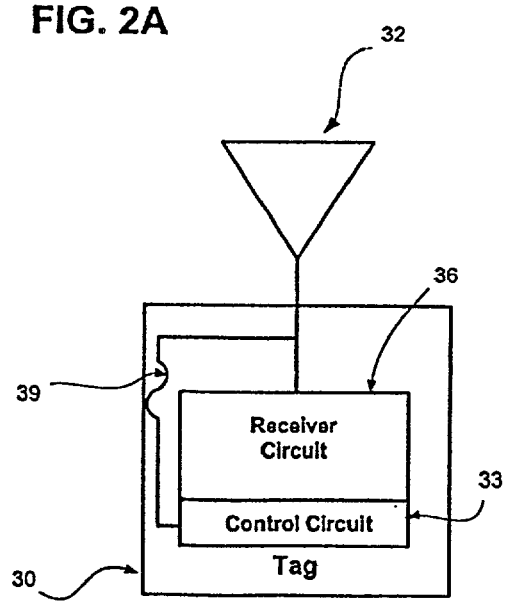

Various methods may be used for disabling the device 30. In the disclosed embodiment, the receiving circuit 36 includes a memory 38, and the control circuit 33 is configured to alter or erase the memory 38 to render the device 30 irreversibly non-responsive. Alternatively, as shown in FIG. 2B, the receiver circuit 36 can be configured to fuse a fusible link 39 in response to the disable signal, such as to ground the antenna 32 or alter its operating characteristics. The receiver circuit 36 may be configured to break an electrical conducting link inside the RFID device 30 (not shown) in a manner that is known in the art and will not be discussed in detail herein.

In another embodiment of the invention, the receiver circuit 36 can be configured to render the antenna 32 or associated antenna circuit inoperable, such as by modifying the operating characteristics. In a passive RFID device, the backscatter or modulation characteristics of the antenna circuit can be permanently modified so that the device 30 does not respond to further interrogation and control signals.

Figure 3:
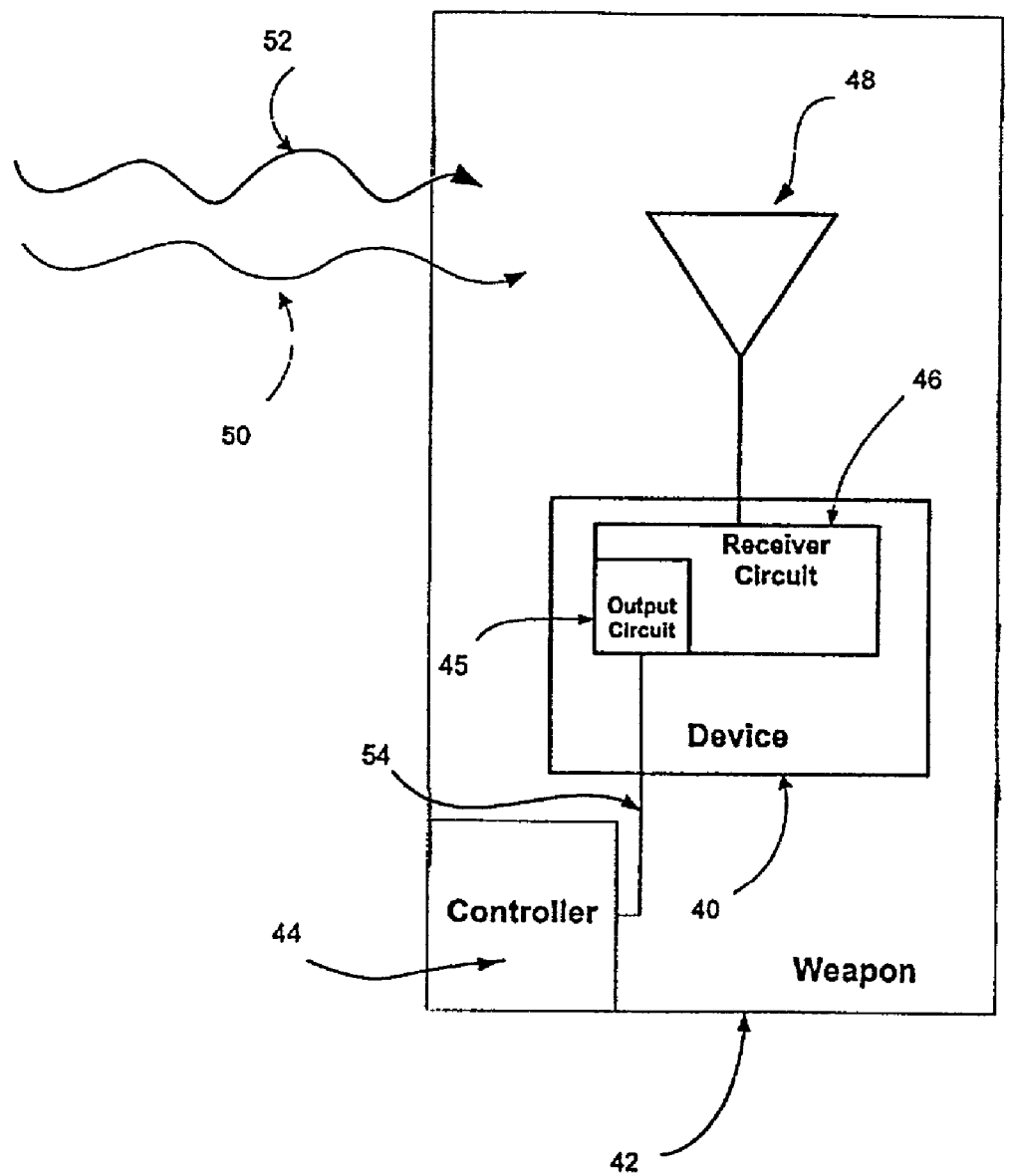
FIG. 3 is a remote frequency identification and control system formed in accordance with another embodiment of the present invention.

Referring next to FIG. 3, shown therein is a radio frequency identification and control device 40 for use in tracking and controlling an operable object in response to interrogation signals 52 and control signals 50 from a remote RFID interrogator, such as the interrogator 26 described above with respect to the embodiment of FIG. 2A. For illustrative purposes, the object in this embodiment is designated as a weapon 42 having a controller 44 for enabling and disabling operation of the weapon 42.

The RFID device 40 in this embodiment includes an output circuit 45 as part of the receiver circuit 46 that is coupled to an antenna 48 formed inside the weapon 42. The output circuit 45 is coupled to the controller 44, which is configured to control operation of the weapon 42. Upon receipt of a control signal 50, the receiver circuit 46 causes the output circuit 45 to output an enable/disable signal to the controller 44. In one embodiment, the control signal 50 comprises a disable signal that is received and processed by the receiver circuit 46 and the output circuit 45 to cause the controller 44 to disable operation of the weapon 42. In another embodiment, the receiver circuit 46 and output circuit 45 are configured to receive a control signal 50 that causes the controller 44 to enable operation of the weapon 42. Ideally, a control signal line 54 couples the output circuit 45 to the controller 44.

In operation, the receiver circuit 46 is configured to return a modulated radio frequency signal in response to an interrogation signal that, in one embodiment, identifies the weapon 42 and provides information about the location of the weapon. In response to a control signal 50 that comprises an enable signal, the receiver circuit 46 and output circuit 45 cause the controller 44 to enable operation of the weapon 42. Similarly, in response to a control signal 50 that comprises a disable signal, the weapon 42 is temporarily or, preferably, permanently disabled.

The controller 44 in this embodiment is configured to receive the signal from the control signal line 54 and effectuate the enable/disable command through conventional circuitry. This can include, but is not limited to, known switched, fuses, and devices that perform similar functions in response to a control signal.

Although preferred embodiments of the invention have been illustrated and described, it is to be understood that various changes may be made therein. For example, the RFID tag, while disclosed as a passive device (without an independent source of power such as a battery), may be configured as a semi-passive device having a battery to operate optional accessory circuits. In addition, the disclosed embodiments of the invention can be combined with an active RFID tag device, if desired.

Optionally, the disclosed embodiments of the present invention may be combined with applicant's prior invention disclosed in U.S. application Ser. No. 09/589,001 filed on Jun. 6, 2000, entitled "Remote Communication System and Method," which is incorporated herein in its entirely. The combination of the present invention with a dual frequency RF tag increases the available power at the tag, and, hence, the range of operation.

More particularly, an interrogator transmits an energy signal at a first frequency that supplies power to the RFID device through a power circuit in the RFID device. The interrogator transmits interrogation signals and control signals at a second frequency, or at a second and a third frequency, respectively, which are processed by the RFID device as described herein above.

CLOSURE

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A radio frequency identification and control system for controlling an operable object in response to interrogation and control signals from a remote radio frequency identification (RFID) interrogator, the system comprising:

a receiver circuit formed inside the operable object and configured to receive on different frequencies the interrogation signals and the control signals and return a modulated radio frequency signal by continuous-wave backscatter in response thereto, the receiver circuit adapted to render the receiver circuit and the operable object permanently inoperable in response to a disable signal, the receiver circuit comprising an antenna that at least a portion of which comprises the operable object.

2. The system of claim 1, wherein the receiver circuit is configured to return radio frequency signals in response to the interrogation signals that comprise data regarding a location of the operable object.

3. The system of claim 1, wherein the receiver circuit is configured to return radio frequency signals in response to the interrogation signals that comprise data regarding an operational status of the object.

4. The system of claim 1, further comprising a fusible link configured to render the receiver circuit and the operable object permanently inoperable.

5. The system of claim 1, wherein the antenna is formed entirely from the operable object.

6. The system of claim 1, wherein the receiver circuit comprises a passive circuit that is powered by the interrogation signals from the interrogator.

7. The system of claim 1, wherein the receiver circuit is battery-powered and comprises an active transmitter circuit.

8. A radio frequency identification and control system, comprising:
   a weapon; and RFID tag device configured to permanently disable the RFID tag device and
   a radio frequency identification (RFID) tag device formed internal to the weapon and coupled to the weapon, the RFID tag device comprising an antenna that at least a portion of which is formed by the weapon and a passive circuit that is powered by remote interrogation signals, the RFID tag device configured to return a modulated continuous-wave backscattered radio frequency signal in response to the remote interrogation signals received at a first frequency and to control operation of the weapon in response to remote control signals received at a second frequency.

9. The system of claim 8, comprising a remote interrogator configured to generate the interrogation signals and the control signals and to receive the return radio-frequency signals.

10. The system of claim 9, wherein the RFID tag device is configured to enable operation of the weapon in response to control signals from the interrogator.

11. The system of claim 9, wherein the RFID tag device is configured to utilize the modulated continuous-wave backscattered radio frequency signals to transmit data regarding operational status of the weapon.

12. The system of claim 9, wherein the RFID tag device is configured to utilize the modulated continuous-wave backscattered radio frequency signals to transmit data regarding location of the weapon.

13. A radio frequency identification and control system, comprising:
   a weapon; and RFID tag device configured to permanently disable the RFID tag device
   a radio frequency identification (RFID) tag device formed internal to the weapon and coupled to the weapon, the RFID tag device comprising an antenna and a passive circuit that is powered by remote interrogation signals, the RFID tag device configured to return a modulated continuous-wave backscattered radio frequency in response to the remote interrogation signals and to control operation of the weapon in response to remote control signals.

\* \* \* \* \*

UNITED STATES PATENT AND TRADEMARK OFFICE
CERTIFICATE OF CORRECTION

PATENT NO. : 6,995,652 B2
APPLICATION NO. : 09/833465
DATED : February 7, 2006
INVENTOR(S) : Curtis Lee Carrender et al.

It is certified that error appears in the above-identified patent and that said Letters Patent is hereby corrected as shown below:

Column 5, lines 24-35
Claim 8 should read as:

-- A radio frequency identification and control system, comprising: a weapon; and a radio frequency identification (RFID) tag device formed internal to the weapon and coupled to the weapon, the RFID tag device comprising an antenna that at least a portion of which is formed by the weapon and a passive circuit that is powered by remote interrogation signals, the RFID tag device configured to return a modulated continuous-wave backscattered radio frequency signal in response to the remote interrogation signals received at a first frequency and to control operation of the weapon in response to remote control signals received at a second frequency, the RFID tag device configured to permanently disable the RFID tag device and weapon in response to control signals from the interrogator--

Column 6, lines 20-32
Claim 13 should read as:

--A radio frequency identification and control system, comprising: a weapon; and a radio frequency identification (RFID) tag device formed internal to the weapon and coupled to the weapon, the RFID tag device comprising an antenna and a passive circuit that is powered by remote interrogation signals, the RFID tag device configured to return a modulated continuous-wave backscattered radio frequency in response to the remote interrogation signals and to control operation of the weapon in response to remote control signals, the RFID tag device configured to permanently disable the RFID tag device and weapon in response to control signals from the interrogator--

Signed and Sealed this

Ninth Day of January, 2007

JON W. DUDAS
*Director of the United States Patent and Trademark Office*